C. F. HEITMANN.
BLOWER SNOW PLOW.
APPLICATION FILED OCT. 14, 1916.
1,233,664.
Patented July 17, 1917.
2 SHEETS—SHEET 1.
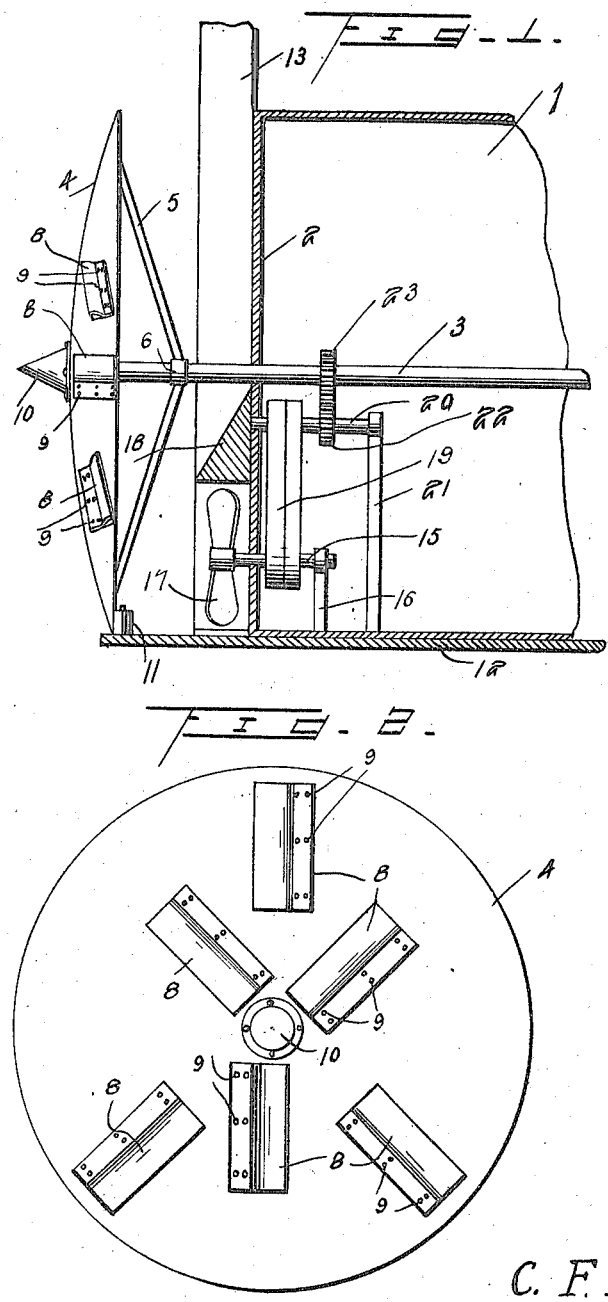

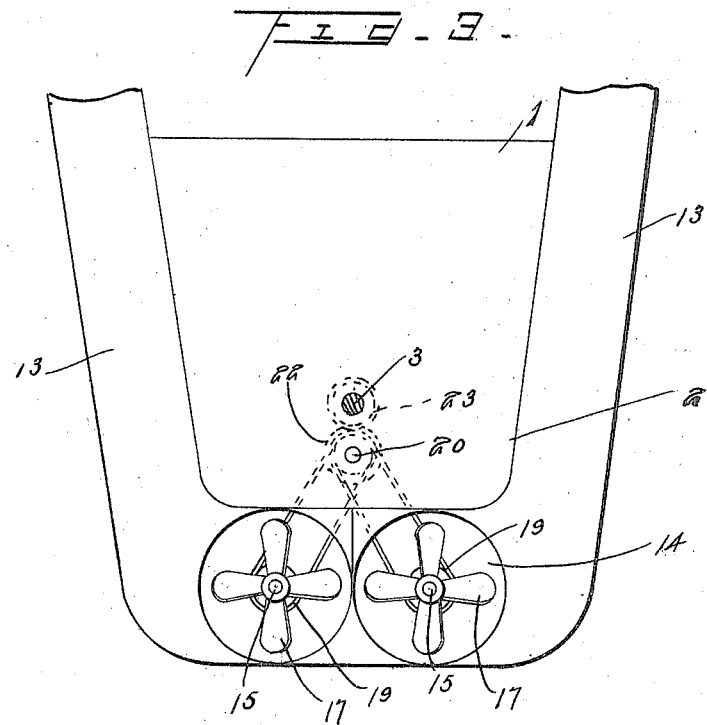
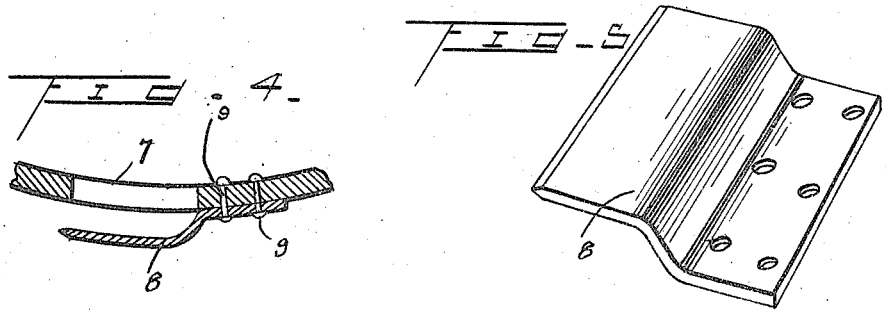

UNITED STATES PATENT OFFICE.

CLARENCE F. HEITMANN, OF MINOT, NORTH DAKOTA.

BLOWER SNOW-PLOW.

1,233,664.

Specification of Letters Patent. Patented July 17, 1917.

Application filed October 14, 1916. Serial No. 125,608.

*To all whom it may concern:*

Be it known that I, CLARENCE F. HEITMANN, a citizen of the United States, residing at Minot, in the county of Ward and State of North Dakota, have invented certain new and useful Improvements in Blower Snow-Plows; and I do hereby declare the following to be a full, clear, and exact description of the invention, such as will enable others skilled in the art to which it appertains to make and use the same.

This invention relates to a snow plow and to the type especially adapted to be readily applied in any suitable manner to a locomotive, electric car, automobile or like vehicle and has for its primary object the provision of a rotating cutter for cutting into a snowdrift or embankment to remove snow from within the path of the device.

Another object of this invention is to provide a disk mounted upon a drive shaft and having cutting blades thereon adapted to cut the snow and force the same through openings in the disk to blowers for forcing the snow to each side of the device.

A further object of this invention is to provide a pair of chutes located adjacent the disk and having the blowers mounted therein for forcing the snow after passing through the disk, to each side of the device.

A still further object of this invention is the provision of a blower snow plow of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference will be had to the following description and accompanying drawings, in which:—

Figure 1 is a fragmentary vertical sectional view, of a blower snow plow, constructed in accordance with my invention.

Fig. 2 is a plan view of the disk.

Fig. 3 is a vertical transverse sectional view of the same illustrating the chute and the blowers mounted therein.

Fig. 4 is a detail sectional view of one of the cutting blades secured to the disk, and Fig. 5 is a perspective view of a cutter blade.

Referring in detail to the drawings, the numeral 1 indicates a casing or housing which may be secured in any suitable manner to a locomotive, electric car, automobile or like vehicle and has its forward end closed by a front wall 2, in which is journaled a drive shaft 3, which is driven by any suitable motive power. The drive shaft 3 extends through the front wall 2 as clearly illustrated in Fig. 1 and has its forward end squared to receive a concavo-convex disk 4 which has secured adjacent the periphery thereof a plurality of brushes 5 which are in turn secured to the drive shaft 3 as illustrated at 6. The disk 4 is provided with a plurality of elongated openings 7, over which extend cutting blades 8 which are bolted or otherwise secured to the disk 4 as illustrated at 9. The free ends of the cutting blades 8 are spaced from the disk 4 as illustrated in Fig. 4, so that upon rotation of the disk in one direction, the cutting blades 8 will engage snow and force it through the disk 4 by way of the openings 7 to the rear side thereof. A substantially conical-shaped member 10 is secured to the forward end of the drive shaft 3 after passing through the disk 4 for boring into the snow and aiding in loosening the snow when packed tightly. A suitable roller 11 is journaled to the flooring 12 of the casing or housing 1 and engages the rear face of the disk 4 for supporting the lower edge of the disk as it rotates with the drive shaft 3.

Chutes 13 are secured upon each side of the casing or housing 1 at the forward end thereof and extend downwardly to the flooring 12 and have their lower ends open as illustrated at 14 to receive the snow after passing through the openings 7 in the disk 4. Suitable stub shafts 15 are journaled within the casing or housing 1 upon standards 16 and extend through the front wall 2 into the open lower ends of the chutes 13 and have secured thereon suitable fans 17 which when rotated create a suction, drawing the snow which passes through the disk 4 into the chute 13 and passing the same outwardly through the chutes 13 upon each side of the device. The fans 17 are partially covered at the top thereof by a hood 18 as clearly illustrated in Fig. 1. Each stub shaft 15 has mounted thereon a suitable pulley on which a belt 19 is mounted and which passes over a pulley mounted upon a stub shaft 20 journaled in a standard 21 located within the casing or housing 1. A gear 22 is secured to the stub shaft 20 and is in mesh with a gear 23 carried by the drive shaft 3 for rotating the fans 17.

From the foregoing description, it will be noted that when the device is applied to a locomotive, electric car, automobile or like vehicle, as the vehicle passes forwardly, and the drive shaft 3 is rotated by a motive power, (not shown), the disk 4 will be rotated, causing the cutting blades 8 to cut the snow and force the snow through the openings 7 to a point rear of the disk 4 from whence the snow is drawn into the chutes 13 by the fans 17 and forced therefrom upon each side of the device by the force or air derived from the fans 17, thereby providing a very efficient snow plow which will readily loosen the snow when packed and will remove same to each side of a given path.

While I have shown and described the preferred embodiment of my invention, it will be understood that minor changes in construction, combination and arrangement of parts may be made without departing from the spirit and scope of the invention as claimed.

Having thus described my invention what I claim is:—

The combination with a housing, of a drive shaft, journaled in the front wall of the housing, a concavo-convex disk secured to the shaft and having a plurality of elongated slots, cutting blades secured to the disk adjacent the slots and having their free cutting edges disposed over the slots and spaced therefrom for cutting snow and forcing it through the slots, chutes secured to the housing and having openings adjacent the lower edge of the disk, fans located in said openings for forcing the snow through the chutes after it passes through the slots of the disk, and means for rotating the disk and fans.

In testimony whereof I affix my signature in presence of two witnesses.

CLARENCE F. HEITMANN.

Witnesses:
 Jos. H. DYCHTOWICZ,
 E. E. MILLER.

Copies of this patent may be obtained for five cents each, by addressing the "Commissioner of Patents, Washington, D. C."